United States Patent
Atwater

[15] 3,661,280
[45] May 9, 1972

[54] AUTOMATIC STORAGE AND SEMI-AUTOMATED ORDER PICKING SYSTEM

[72] Inventor: Wayne G. Atwater, Willoughby, Ohio
[73] Assignee: The Triax Company, Cleveland, Ohio
[22] Filed: Aug. 27, 1969
[21] Appl. No.: 853,325

[52] U.S. Cl. ..........................................214/16.4 A, 187/71
[51] Int. Cl. ..................................................B65g 1/06
[58] Field of Search ..................214/16.4; 187/20, 71, 73, 94

[56] References Cited

UNITED STATES PATENTS

| | | | |
|---|---|---|---|
| 296,315 | 4/1884 | Chandler | 187/71 |
| 675,330 | 5/1901 | Ihlenfeldt | 187/71 |
| 1,927,677 | 9/1933 | Bennington | 214/16.4 X |
| 3,016,973 | 1/1962 | Williamson | 214/16.4 X |
| 3,049,247 | 8/1962 | Lemelson | 214/16.4 |
| 3,055,517 | 9/1962 | Kirkland | 214/16.1 |
| 3,202,242 | 8/1965 | Dolphin | 214/730 X |
| 3,206,041 | 9/1965 | McGrath | 214/16.4 X |
| 3,263,777 | 8/1966 | Robichon | 214/16.4 X |
| 3,292,804 | 12/1966 | Veneman | 214/730 |

FOREIGN PATENTS OR APPLICATIONS 1,229,454  11/1966  Germany................214/16.4

Primary Examiner—Gerald M. Forlenza
Assistant Examiner—R. B. Johnson
Attorney—Baldwin, Egan, Walling & Fetzer

[57] ABSTRACT

An automatic warehousing system for storing and unstoring loads in which the movable load carrier unit for the system comprises an elevator portion having spaced load carrying extractor mechanisms mounted thereon for lateral movement with respect to the elevator portion for movement into and out of selected storage bins or spaces. An operator's station or cage is disposed between the extractor mechanisms and so arranged to provide accessibility to the extractor mechanisms from either side of the operator's cage so that order picking of stock supported on one of the extractor mechanisms after having been removed from storage by the latter extractor mechanism and deposited on the other of the extractor mechanisms, can be accomplished by the operator from his work station or cage. The arrangement is such that the operator's station is also movable vertically relative to the elevator portion. A multi-level conveyor system is provided for feeding loads into and out of the system.

13 Claims, 9 Drawing Figures

INVENTOR
WAYNE G. ATWATER
BY
Baldwin, Egan, Walling & Fetzer
ATTORNEYS

PATENTED MAY 9 1972 3,661,280

INVENTOR
WAYNE G. ATWATER
BY
Baldwin, Egan, Walling & Fetzer
ATTORNEYS 3,661,280

AUTOMATIC STORAGE AND SEMI-AUTOMATED ORDER PICKING SYSTEM

This invention relates in general to automatic warehousing systems for storing or unstoring loads by transferring them between a movable load carrier unit and a storage frame and more particularly relates to a warehousing system embodying a load carrier unit having an operator's work station mounted thereon for order picking operations, and wherein the work station is movable vertically with respect to the elevator portion of the load carrier unit.

BACKGROUND OF THE INVENTION

Automatic warehousing systems comprising an automatically controlled mechanized load carrier movable along an aisle or travel zone and having an elevator and associated extractor mechanism for transporting loads to different levels in the storage frame are known in the art. Reference may be had to U.S. Pat. application Ser. No. 700,787, filed Jan. 26, 1968 in the name of Wayne G. Atwater and entitled "STORAGE AND ORDER PICKING SYSTEM," which discloses an automatic warehousing system which includes an order picking unit adapted to carry an operator for order picking stock from the storage bins or storage cubicles in the warehousing system. However, in such arrangement, the picking unit is separate from the automatic load carrier unit of the system.

SUMMARY OF THE INVENTION

The present invention provides an automatic warehousing system which includes a load carrier unit having a vertically movable elevator portion with a pair of spaced load handling extractor mechanisms mounted on the elevator portion for movement laterally thereof and into and out of selected storage bins of the storage frame, for handling loads of stock between the load carrier unit and the storage frame. An operator's work station is provided on the elevator portion and is so constructed and arranged with respect to the extractor mechanisms that one of the extractor mechanisms can be conveniently utilized to remove a load of stock from the storage frame and the other of the extractor mechanisms can support a stock receiving means thereon, for transfer of stock by the operator in the operator's work station from the one stock supporting extractor to the stock receiving means on the other extractor. The extractors are adapted to be separately controllable and may be controlled from the operator's work station on the load carrier unit. The operator's work station is preferably made so as to be movable vertically with respect to the elevator portion so that the vertical position of the work station can be varied with respect to the elevator portion and safety free-fall protection is provided for the operator's work station, whereby relative vertical movement of the operator's work station with respect to the rest of the load carrier unit is restricted.

Accordingly, an object of the invention is to provide a novel warehousing system.

Another object of the invention is to provide a novel warehousing system which includes a mechanized load carrier unit for storing and unstoring loads in the storage frame of the system, and wherein the load carrier unit comprises a vertically movable elevator portion with spaced extractor mechanisms mounted on the elevator portion for lateral movement with respect thereto for handling loads at selected of the storage locations in the storage frame, and with an operator's work station disposed adjacent the extractor mechanisms so that an operator located at the work station can order pick stock supported on one of the extractor mechanisms and transfer it to the other extractor mechanism.

A further object of the invention is to provide a warehousing system of the latter type wherein the work station is movable vertically relative to the elevator portion.

A further object of the invention is to provide an automatic warehousing system of the latter discussed type wherein the operator's station is mounted on a support platform supported by the elevator portion with means counterweighting the support platform and normally maintaining the support platform and supported operator's station at a selected level with respect to the elevator portion, but wherein the support platform and opertor's station are movable vertically with respect to the elevator portion and without interference with the latter upon predetermined loading of the operator's station.

A still further object of the invention is to provide a warehousing system of the above described type which includes safety means providing free-fall protection for the operator's station, whereby relative vertical movement of the operator's station with respect to the load carrier is restricted.

A still further object of the invention is to provide an automatic warehousing system of the aforediscussed type which includes a plurality of input-output conveyor mechanisms disposed at different levels and operatively coupled to pickup and discharge stations disposed at different levels with one of the conveyor mechanisms and associated pickup and discharge stations being a supply station for supplying loads to one of the extractor mechanisms and the other of the conveyor mechanism and associated pickup and discharge stations being a supply station for supplying stock containers to the other of the extractors.

Other object and advantages of the invention will be apparent from the following description taken in conjunction with the following drawings.

DESCRIPTION OF THE PREFERRED EMBODIMENTS

Figure 1:
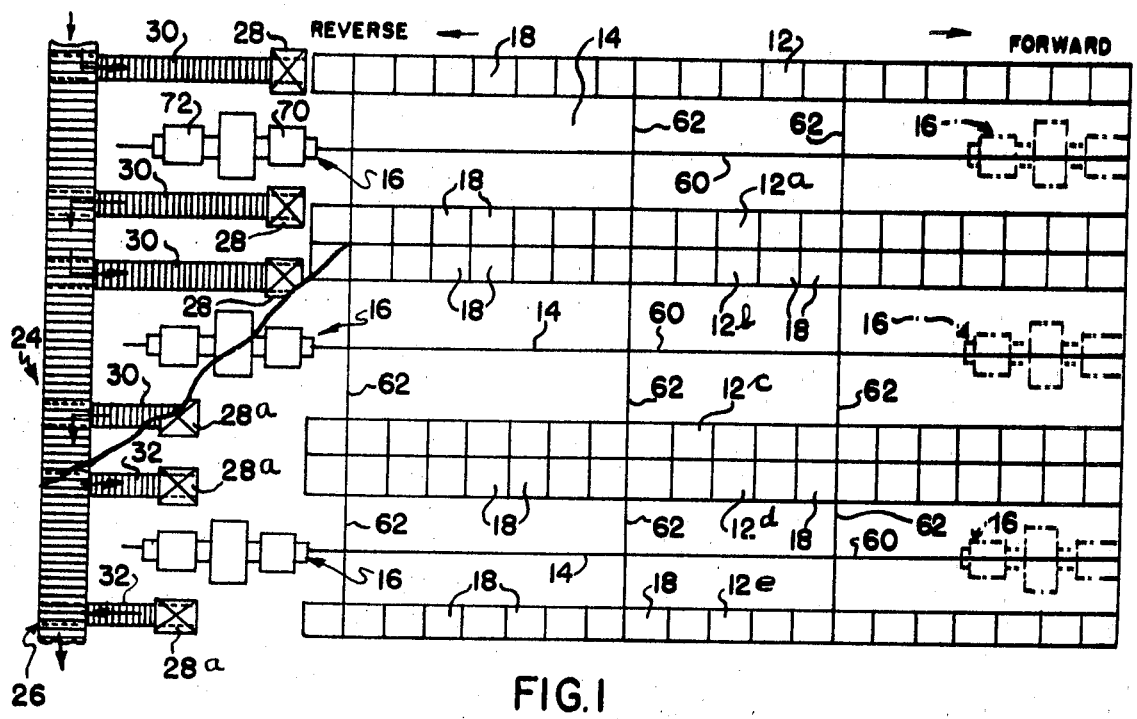
FIG. 1 is a partially broken top plan diagrammatic illustration of a warehousing system embodying the present invention.

Referring now again to the drawings, the warehousing system may comprise a plurality of generally parallel storage bay sections 12, 12a, 12b, 12c, 12d and 12e defining between each pair thereof an aisle or travel zone 14, so as to permit a motorized load carrier unit indicated generally at 16 to be moved along the aisle or travel zone and to insert loads into and withdraw loads from the load support means or storage bins 18 formed by the storage bays 12 to 12e.

Each storage bay may be constructed of a plurality of vertically extending laterally spaced posts 20, 20a (FIG. 4) spaced apart by a plurality of generally horizontally extending load supporting rails 22 defining a plurality of the aforementioned storage bins. Stops (not shown) may be provided at the outer ends of the rails 22 for preventing the inadvertent movement of a load completely through the selected bin. The storage frame construction may be generally similar to that disclosed in U.S. Pat. No. 3,371,804 issued Mar. 5, 1968 in the name of Anthony R. Chasar and entitled "AUTOMATIC WAREHOUSING SYSTEM," and reference may be had thereto for a more detailed discussion of structural details of a suitable warehousing storage frame.

Disposed at one end of the storage frame complex and running transverse to the direction of extension of the aisle 14 are input-output conveyor systems 24, 26. Conveyor systems 24, 26 may comprise preferably power driven conveyors of conventional types, such as for instance, roller type or belt type, with conveyor system 24 being disposed above conveyor system 26. Conveyor system 24 is adapted to supply loads of stock material to the load carrier unit whereby the latter can transfer the stock into the storage frame, and to convey stock loads, removed from storage by the load carrier unit, out of the warehousing system. In this connection there may be provided upper and lower pickup and discharge stations 28, 28a with each of the storage bays 12 through 12e having a pair of the pickup and discharge stations 28, 28a associated therewith at one end thereof. Such pickup and discharge stations are adapted for receiving a load of stock or an empty container for order picked stock for handling by the load carrier, and are also adapted to receive loads of stock after removal of the loads from the storage bins of the respective storage bay, for subsequent movement of the loads of stock out of the warehousing system. Pickup and discharge stations 28 are disposed at an upper level and at a level complementary to the level of main conveyor 24 while pickup and discharge stations 28a are disposed at a lower level and at a level complementary to the lower main conveyor 26. Connecting each pickup and discharge station 28 and 28a is a spur conveyor section 30, 32 which communicates the respective pickup and discharge station with the associated main conveyor mechanism.

As can be best seen from FIG. 1, the main conveyor mechanism 24 may supply loads of stock to one of the pickup and discharge stations 28 on one side of the associated load carrier unit 16 while the pickup and discharge station 28 on the other side of the load carrier unit may be used as a discharge station from which loads of stock removed from storage by load carrier unit 16 are moved out of the system via the associated spur conveyor 30 and then back onto the main conveyor mechanism 24 either for removal from the system or for storage back into the system in a down stream storage bay. The lower pickup and discharge stations 28a associated with each of the storage bays may likewise be supply and discharge stations for receiving empty containers which are adapted for receiving order picked stock therein after which the container may be placed on the outgoing pickup and discharge station 28a on the other side of the load carrier unit from the incoming pickup and discharge station 28a, and the container with the order picked stock may then be moved back via its spur conveyor 32 to the main conveyor section 26 whereby the order picked stock can be moved out of the warehousing system or back into a downstream storage bay of the system. This will hereinafter be described in somewhat greater detail in connection with the operation of the system.

Figure 3:
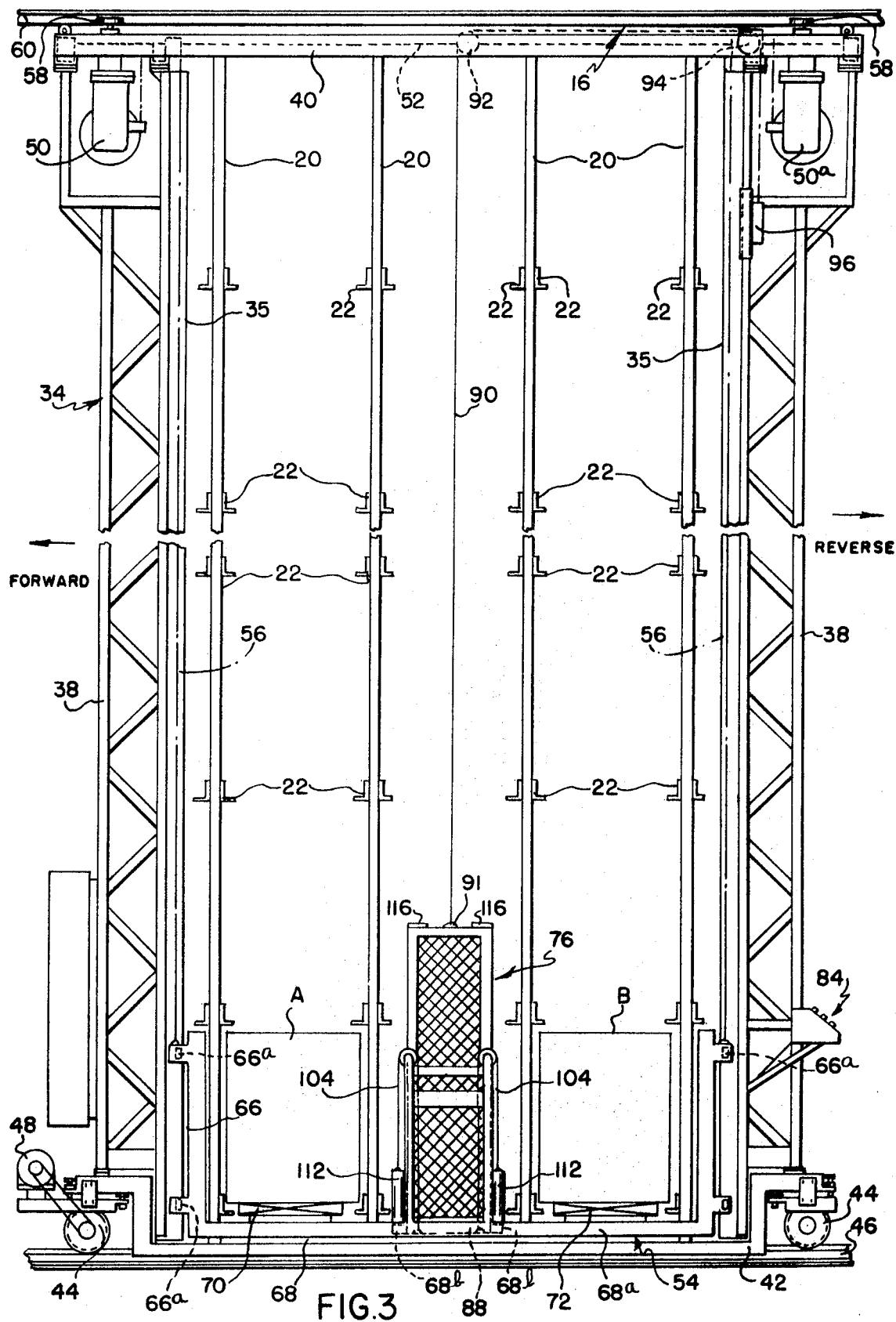
FIG. 3 is an enlarged, broken, side elevational view of the load carrier unit of the system illustrating the pair of spaced extractor mechanisms with the operator's work station disposed therebetween.

The aforementioned load carrier unit 16 may comprise a horizontally movable conveyor frame portion 34 including generally upright mast structure formed by a pair of generally vertically extending preferably hollow track members 35 (FIG. 3). Each of the tracks 35 may be reinforced as by means of an associated truss 38 suitably coupled to the respective track member 35. The mast structure and reinforcing truss structure extend between upper and lower sections 40, 42 of the conveyor portion 34 of the load carrier unit and are secured thereto.

The lower carrier section 42 may comprise a generally U-shape (in side elevation) carriage frame (FIG. 3) supported on flanged wheels 44 which in turn ride on a rail member 46 extending lengthwise of each of the travel zones and mounted, in the embodiment illustrated, on the floor of the storage area. As can be readily seen from FIG. 3, the carriage 42 is of substantial lengthwise dimension so that the stability of the conveyor portion 34 of the load carrier unit is very good and thus the upper section 40 of the conveyor portion moves along with the lower carriage section 42 in good alignment therewith. The lower carriage section 42 may be driven as by means of a preferably reversible electric motor 48 operatively coupled to one of the wheels 44 of the carriage for driving the load carrier unit along the rail 46.

The upper section 40 of the load carrier unit may include a generally rectangular frame preferably supporting a pair of reversible electric motors 50, 50a thereon. Both of motors 50, 50a are operatively coupled via conventional reduction gearing to a common shaft 52 (FIG. 3) journalled on upper frame section 40 which shaft is operatively coupled to the elevator portion 54 of the load carrier unit as by means of flexible chain 56 for moving the elevator portion vertically on the mast tracks 35. Each of the hoisting mechanism 50, 50a is preferably able to singly carry the entire load of the elevator in the event of failure of one of such mechanisms including failure of the associated chain 56.

Due the stability and rigidity of the load carrier framework including the conveyor portion 34, mast structure 35 and reinforcing truss structure 38, the load carrier conveyor portion 34 is maintained in good alignment with the vertical posts 20, 20a of the storage frame as the load carrier moves along its respective aisle to deposit loads into and or retrieve loads from the storage bins.

Figure 4:
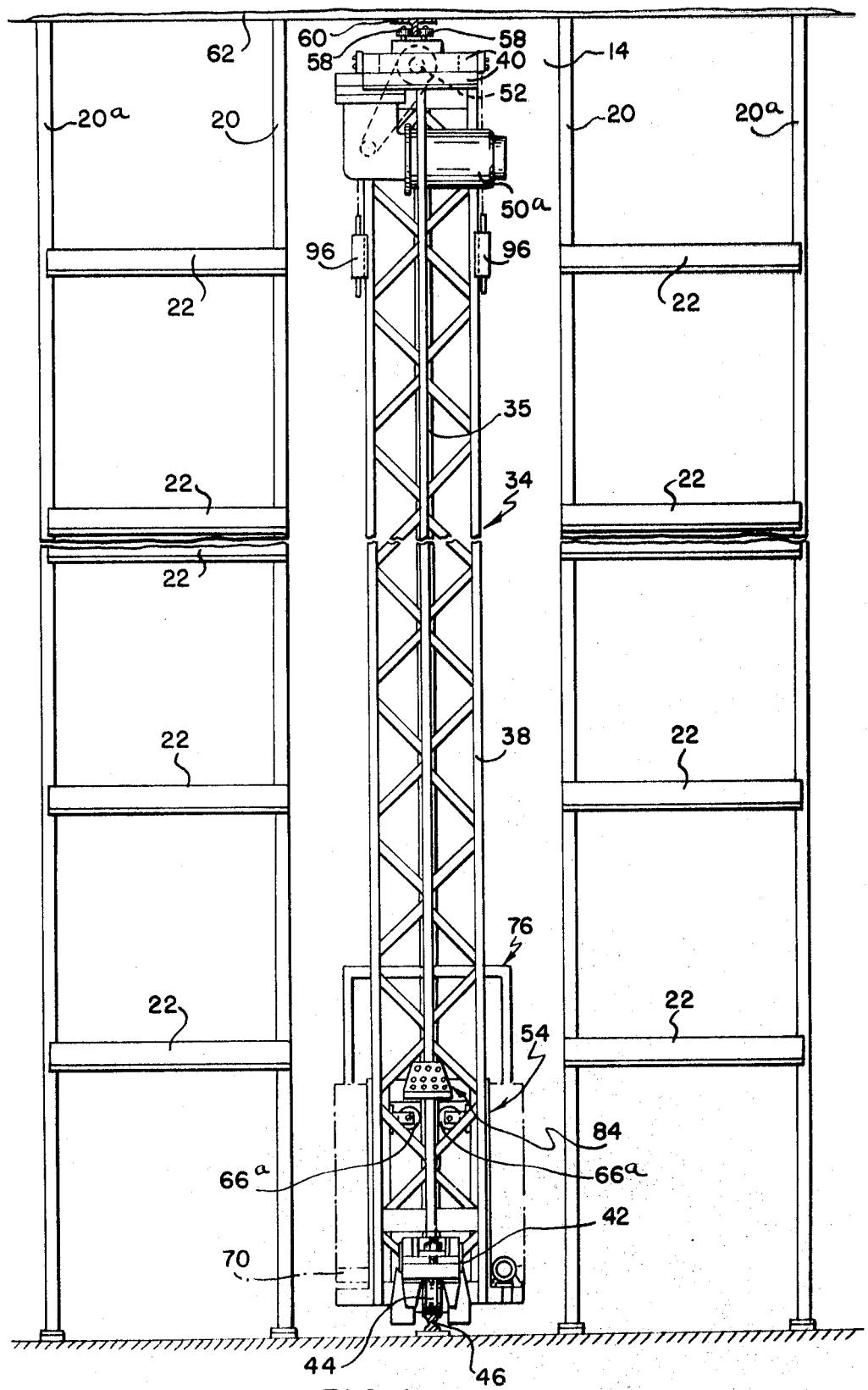
FIG. 4 is an enlarged end elevational view of the load carrier unit of FIG. 3.

As can be seen in FIG. 4, the upper section 40 of the conveyor portion 34 may have laterally spaced rollers 58 rotatably mounted thereon which rollers coact in rolling engagement with an upper rail member 60 running lengthwise of each of the aisles of the warehousing system generally parallel to associated rail 46. Rail 60 may be supported on the storage frame by cross structure 62 thereof. Rollers 58 guide the upper end of the load carrier unit in its horizontal movement along the respective aisle.

The aforementioned elevator portion 54 may comprise side portions 66 (FIG. 3) having vertically spaced sets of rollers 66a rotatably mounted thereon and adapted for rolling coaction with the aforementioned tracks 35 of the mast structure for guiding the vertical movement of the elevator with respect to the conveyor portion of the load carrier. Connecting the side portions 66 of the elevator is a base portion 68 which is preferably of rectangular frame construction comprising side rails 68a attached at their ends to the side portions 66 of the elevator. Side rails 68a define therebetween an open space or passageway 69 (FIG. 8) for a purpose to be hereinafter described.

Mounted on the elevator portion 54 is a laterally spaced pair of extractor mechanisms 70, 72, each of which is adapted to move laterally of the elevator portion with a load supported thereon and deposit the load in a selected storage bin of the storage frame or to move laterally of the elevator portion to pickup a load that is already in the storage frame, and move it back onto the load carrier unit. Each of the extractor mechanisms 70, 72, preferably provides an extensible table-like mechanism with the table being extendible in either of the opposed directions transverse to the direction of movement of the load carrier unit in a travel zone, so as to locate the extractor within either of the storage sections associated with each travel zone, effective to place the extensible table in position to deposit a load into or remove a load from a selected storage bin in the selected storage bay section. Suitable power means such as an electric motor operatively coupled to conventional gearing mechanism may be provided operably coupled to each of the extractors for actuating the latter. Such extractor mechanisms are preferably both separately actuatable and also actuatable in unison, and also include suitable control mechanisms for actuating the extractor mechanisms in unison. Reference may be had to U.S. Pat. No. 3,432,056 issued Mar. 11, 1969 for a detailed disclosure of suitable extendible extractor mechanism.

When depositing a load in a selected one of the storage bins of the storage frame, the elevator 54 and one or the other of the associated extractor mechanisms 70 or 72 may be located opposite the selected storage bin such as the load is moved into the selected bin the upper surface of the extractor is slightly above the horizontal flanges of the respective load supporting rails 22 mounted on the sides of and defining the bottom extremity of the selected bin. When the load is completely within the confines of the bin, the elevator mechanism 54 may be lowered slightly to deposit the load being supported by the extractor mechanism onto the supporting rail members and permit retraction of the extractor back to its generally centered position with respect to the elevator.

Conversely, when it is desired to move a load from a selected bin, one or the other of the extractors on the elevator is located such that the top surface of the chosen extractor is extended into the bin slightly below the load resting therein. Thereafter the elevator 54 may be raised as by means of the power units 50, 50a so as to lift the load off its supporting rails 22 and then the extractor is retracted back to its centered position preparatory to either moving the load carrier to its next position in the warehousing system or for order picking the load supported on the extractor mechanism.

In order to make expeditious the order picking of loads from loads removed by a respective extractor from storage in the storage frame, an operator's work station 76 (FIGS. 3, 4 7 and 8) is mounted on the elevator portion 54 of the load carrier unit intermediate the extractor mechanisms 70, 72. The operator's station 76 in the embodiment illustrated comprises a compartment, which in the embodiment illustrated is a cage-like structure which may have wire screening or the like covering its lateral sides, as at 78, and which is preferably open as at 80 (FIG. 8) on its end sides for providing accessibility by the operator to both of the extractor mechanisms, which are disposed adjacent opposite end sides of the operator's station. The work station 76 has a floor and may have a seat (not shown) on which an operator may sit, and preferably has overriding controls 82 therein (FIG. 8) which enable the operator to control the operation of the load carrier mechanism including the conveyor portion, the elevator portion and the operation of the extractor mechanisms 70, 72, from the work station 76 on the load carrier unit.

The load carrier unit is also preferably arranged so as to be able to be automatically programmed and controlled either from a control console 84 (FIGS. 3 and 4) supported for instance on the conveyor portion 34 of the load carrier unit, or from a control panel disposed remote from the load carrier unit. The automatic control system may be one similar to that described in U.S. Pat. No. 3,402,835 dated Sept. 24, 1968 in the name of Sanford Saul. Thus the load carrier unit may be used for automatic retrieval and storage of full loads without having an operator ride the load carrier unit, or may be used for order picking of stock by an operator riding the load carrier unit, or may be used for a combination of the aforesaid operations. During automatic programming, both extractor mechanisms can place loads into and remove loads from storage in one programmed cycle, which is highly desirable when high load handling activity is required.

The operation of the load carrier unit is such that when order picking of stock from the loads in the storage frame is desired, the operator in cage 76 can so control the extractor mechanism 70, 72 so that one of the extractor mechanisms (either 70 or 72) can be extended into the selected bin where the load of stock is located in which a portion of the stock in such load is desired for a particular order. The extractor and supported load of stock can then be retracted back to its generally centralized position with respect to the load carrier elevator portion, while the other extractor, which has not been energized, has located thereon an empty container, or skid, or the like for receiving the stock order picked from the load of stock on the one stock supporting extractor. It will be seen therefore that one of the extractor mechanisms supporting an empty container for receiving order picked stock serves, while the load carrier is in the storage structure, to only carry the container in which the stock parts are accumulated during the order picking operation and such extractor mechanism is not adapted to be operated while in the storage structure.

Figure 2:
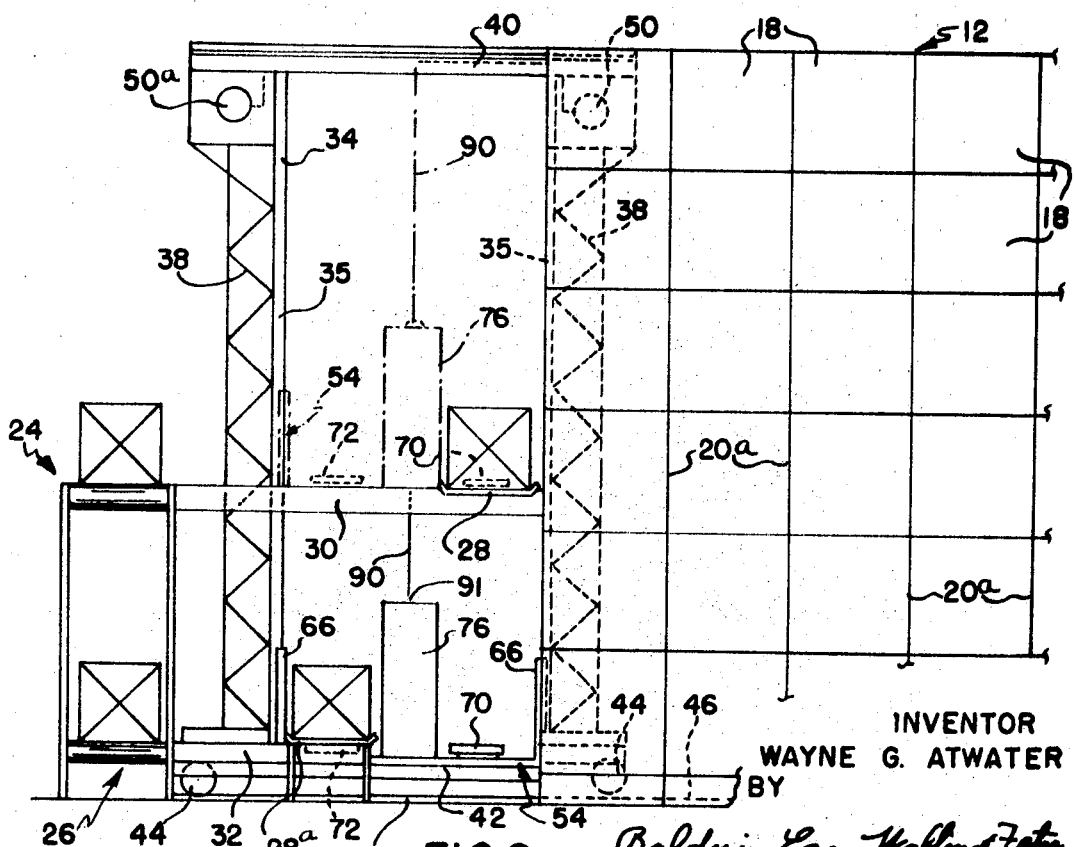
FIG. 2 is a fragmentary, enlarged, generally diagrammatic side-elevational view of the system illustrated in FIG. 1 and showing the plurality of input-output conveyor lines disposed at different levels and operatively coupled to respective pickup and discharge stations disposed at different levels, for respectively supplying loads of stock to one of the extractors and supplying empty containers for receiving order-picked stock to the other extractor.
Figure 5:
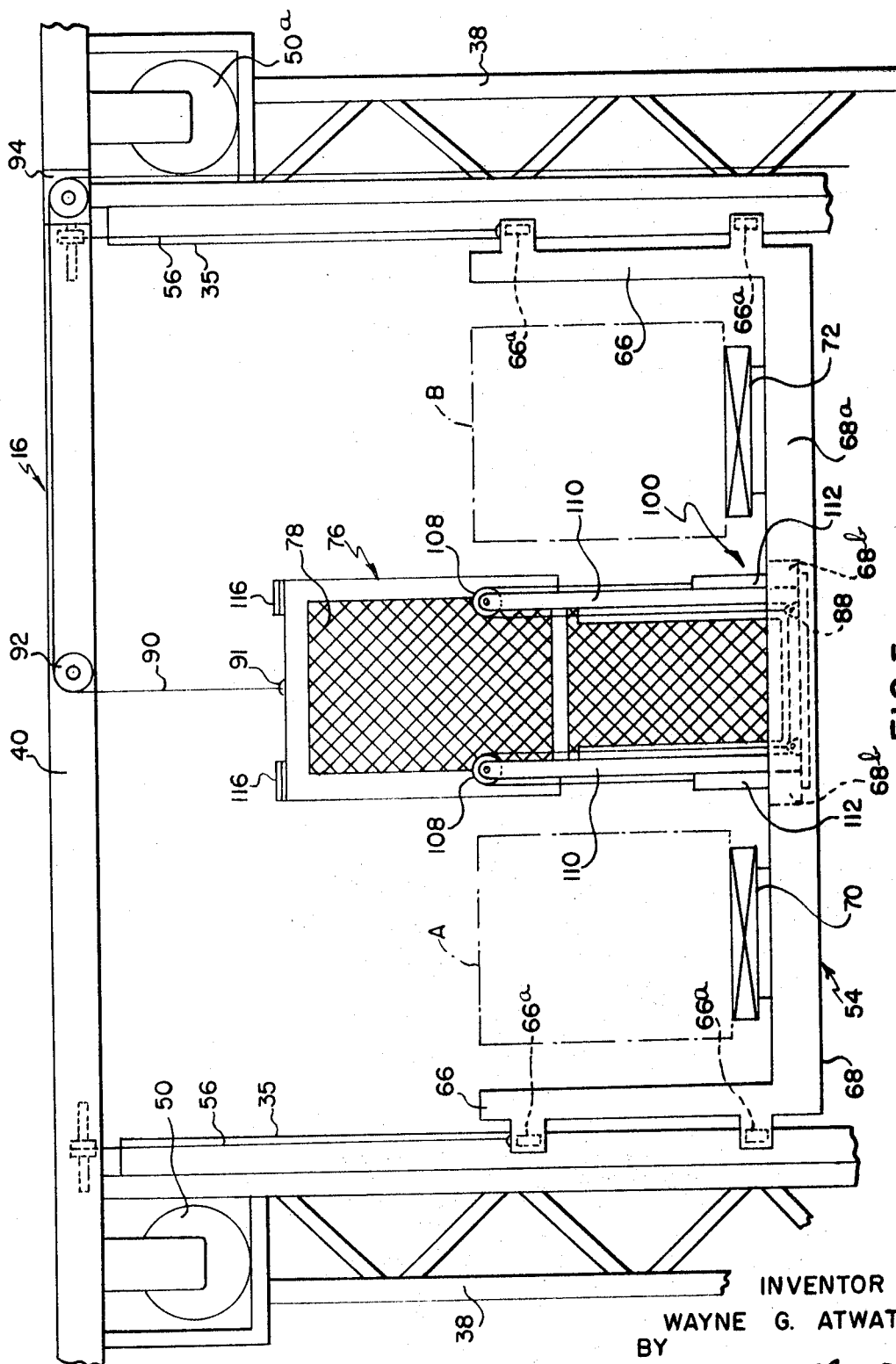
FIG. 5 is an enlarged, fragmentary, side elevational view of the operator's work station disposed between the pair of extractor mechanisms on the elevator portion of the load carrier unit and showing the safety free-fall protection for the operator's station for restricting vertical movement of the operator's station with respect to the horizontally movable conveyor portion of the load carrier unit.

In this connection and referring again to FIG. 1, the upper input-output conveyor system 24 and associated spur conveyors 30 and upper pickup and discharge stations 28, may be adapted for carrying empty tubs or skids and positioning such tubs or skids so as to be picked up by the forward of the extractor mechanisms (i.e. 70 with reference to FIGS. 2 and 3) of the load carrier unit, while the lower input-output conveyor mechanism 26 and associated spur conveyors 32 and pickup and discharge stations 28a, may be adapted for moving loads of stock into the system for positioning at the associated pickup and discharge stations 28a, whereupon the associated load carrier transfers such full tubs or containers of stock material into the storage system. These full tubs of stock stored in the storage system provide of course the source of stock for the order picking operations. Thus the rearward extractor mechanism 72 may be adapted for picking up the full tubs for storage in the structure and this may be the extractor mechanism which is used continually for handling stock in storage during the order picking process. As aforementioned, the front extractor mechanism initially supporting an empty tub or container A (FIG. 3) is not adapted to be energized during an order picking process in the storage complex. When a container or tub which is to have stock parts picked therefrom is removed from the storage structure by the rearward extractor mechanism 72 and brings the tub (e.g. B, FIGS. 3 and 5) aboard the load carrier unit, the operator can then transfer via the open sides 80 of the operator's station, the required number of parts to the accumulation tub or container A located on the front extractor mechanism 70. After the desired number of parts are removed from the stock tub B into the accumulator tub A, the rear extractor mechanism is then operated to restore the stock tub in the same opening it was taken from. The operator may then control the load carrier unit via controls 82 to proceed to the next desired bin opening, and so on until the accumulation tub is full of the desired order picked parts. The full tub of order picked parts can then be deposited by the load carrier at associated pickup and discharge station 28 for movement out of the system on conveyor mechanism 30, 24.

The operator's cage 76 is preferably provided with means providing safety free-fall protection therefor, whereby relative vertical movement of the station 76 with respect to the elevator portion 54 of the load carrier unit is provided for and restricted in amount. In this connection, the cage 76 is completely separable from the elevator portion 54 and is movable vertically relative thereto. The cage 76 may be supported on a platform 88 (FIGS. 7 and 8) which nests between the aforementioned side components 68a of the elevator portion. Projection means 89 (FIG. 7) may be provided on the underside of cage 76, adapted for coaction with complementary socket means 89a on the platform and releasably positioning it with respect to the platform. Such socket and projection structure may also couple the control lines from the power to the controls 82 in the operator's cage for operating the load carrier unit from the work station 76. Projection and socket means 89, 89a is unplugged when the cage 76 moves vertically away from the platform 88.

As can be seen in FIGS. 2 – 8, the free-fall protection means for the operator's cage may include a plurality of safety lines 90 attached as at 91 to the cage and passing about pulleys 92 mounted on the upper frame section 40 of the conveyor portion 34 of the load carrier unit 16. The safety lines 90 after passing about pulleys 92, pass into coaction with an overspeed preventing mechanism such as, for instance, a conventional centrifigal clutch 94, likewise mounted on the upper frame section 40 of the conveyor portion, and then the lines are attached to a respective weight 96. Weights 96 are preferably attached to the truss structure 38 for guided movement vertically with respect thereto. If the lift chain 56 for the elevator portion, or the lift mechanism per se including the power to the motor units 50, 50a should fail, the elevator portion 54 and platform 88 would move rapidly downwardly relative to the conveyor portion 34. The safety free-fall protection prevents the rapid downward movement of the operator's cage 76 due to the action of the overspeed mechanisms 94 coacting with the respective cable 90, and thus the operator's cage 76 would be separated from the platform 88 and elevator portion 54 as the cage lowers at a slow rate of descent.

Figure 9:
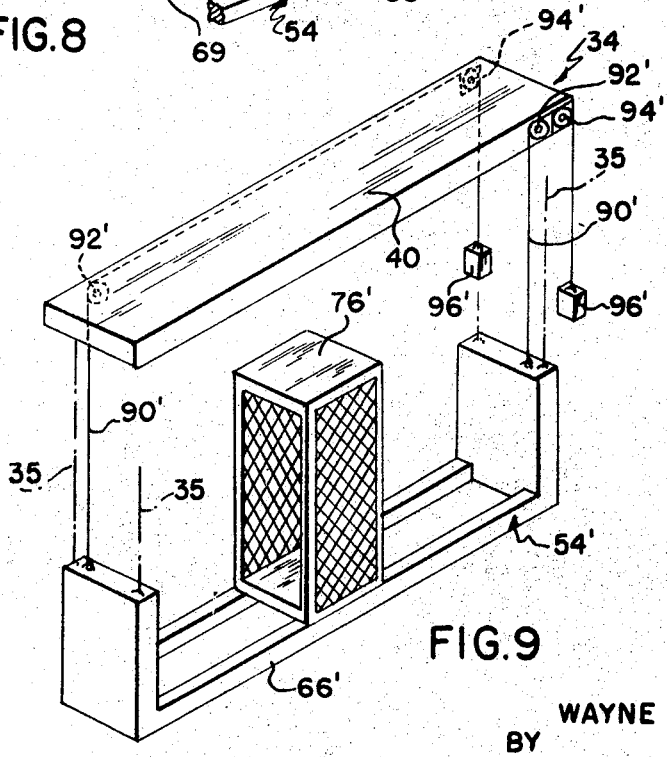
FIG. 9 is a diagrammatic illustration of another embodiment wherein the elevator portion is provided with safety free-fall protection rather than just the operator's work station, for restricting vertical movement of the elevator portion with respect to the remainder of the load carrier unit in the event of failure of the suspension for the elevator portion; in this embodiment the operator's work station may be supported directly on the elevator portion and is not adapted to be separated therefrom.

Referring now to FIG. 9, instead of having the operator's cage 76' separable vertically from the elevator portion 54' and provided with free-fall protection as in the above described embodiment, in this embodiment the elevator portion 54' is itself provided with the free-fall protection while the operator's cage 76' may be fixedly mounted on the elevator portion. The free-fall protection may include the same components as aforedescribed or mainly safety lines 90' extending about rotatable pulleys 92' and coacting with overspeed prevention mechanism 94' with weights 96' supported on the distal ends of the safety lines 90'. It will be seen that, in the event of failure of the elevator lift chains 35 or the associated power mechanism 50, 50a, the elevator is prevented from free vertical fall, due to the safety free-fall protection means.

Figure 6:
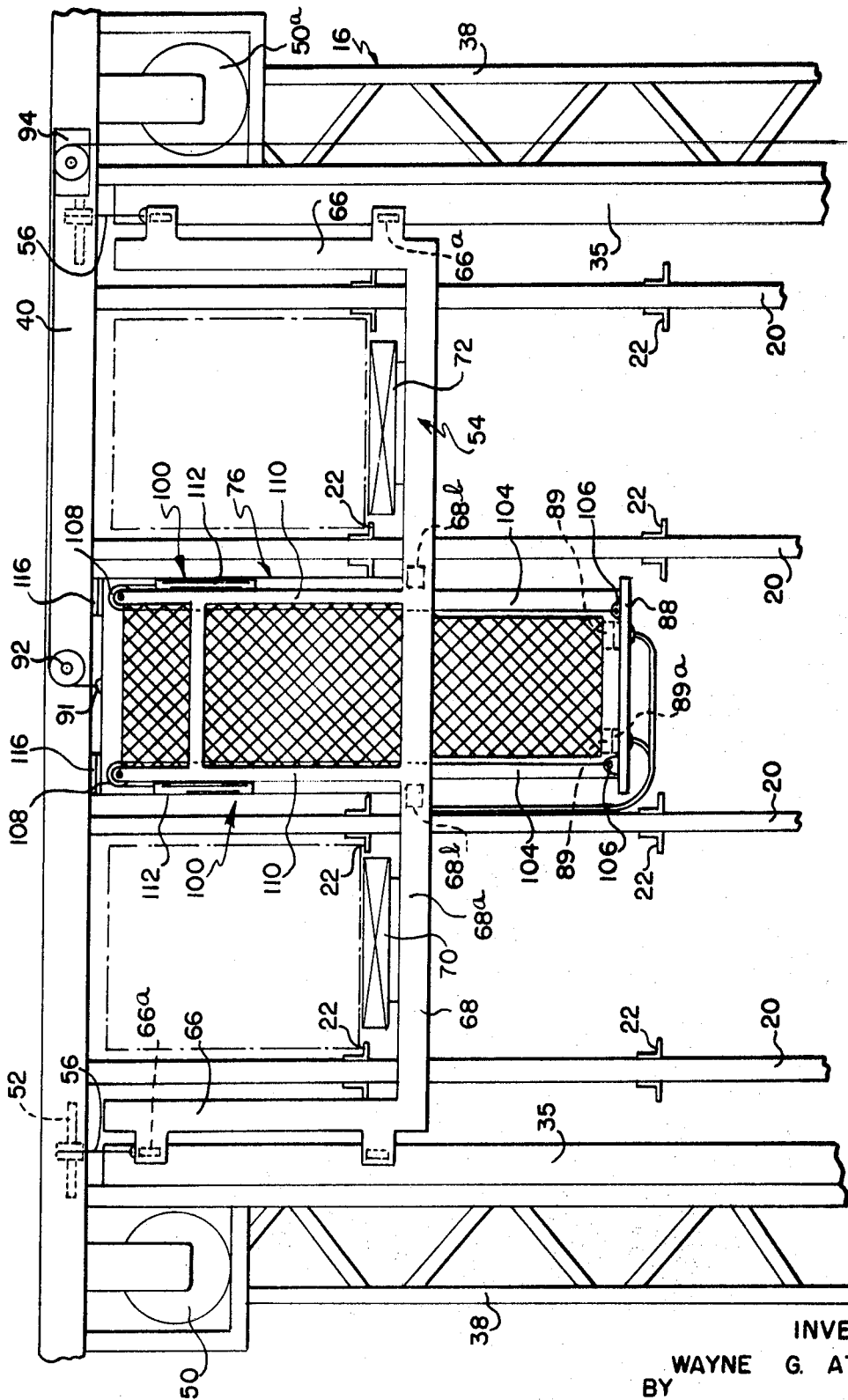
FIG. 6 is a side elevational view similar to FIG. 5 showing the maximum upward movement of the elevator portion with respect to the conveyor portion and with engagement having occurred between the operator's work station and the upper end of the conveyor portion of the load carrier unit, to cause relative downward movement of the operator's work station with respect to the elevator portion thereby permitting the elevator portion to handle loads in the uppermost bin levels of the storage frame.
Figure 7:
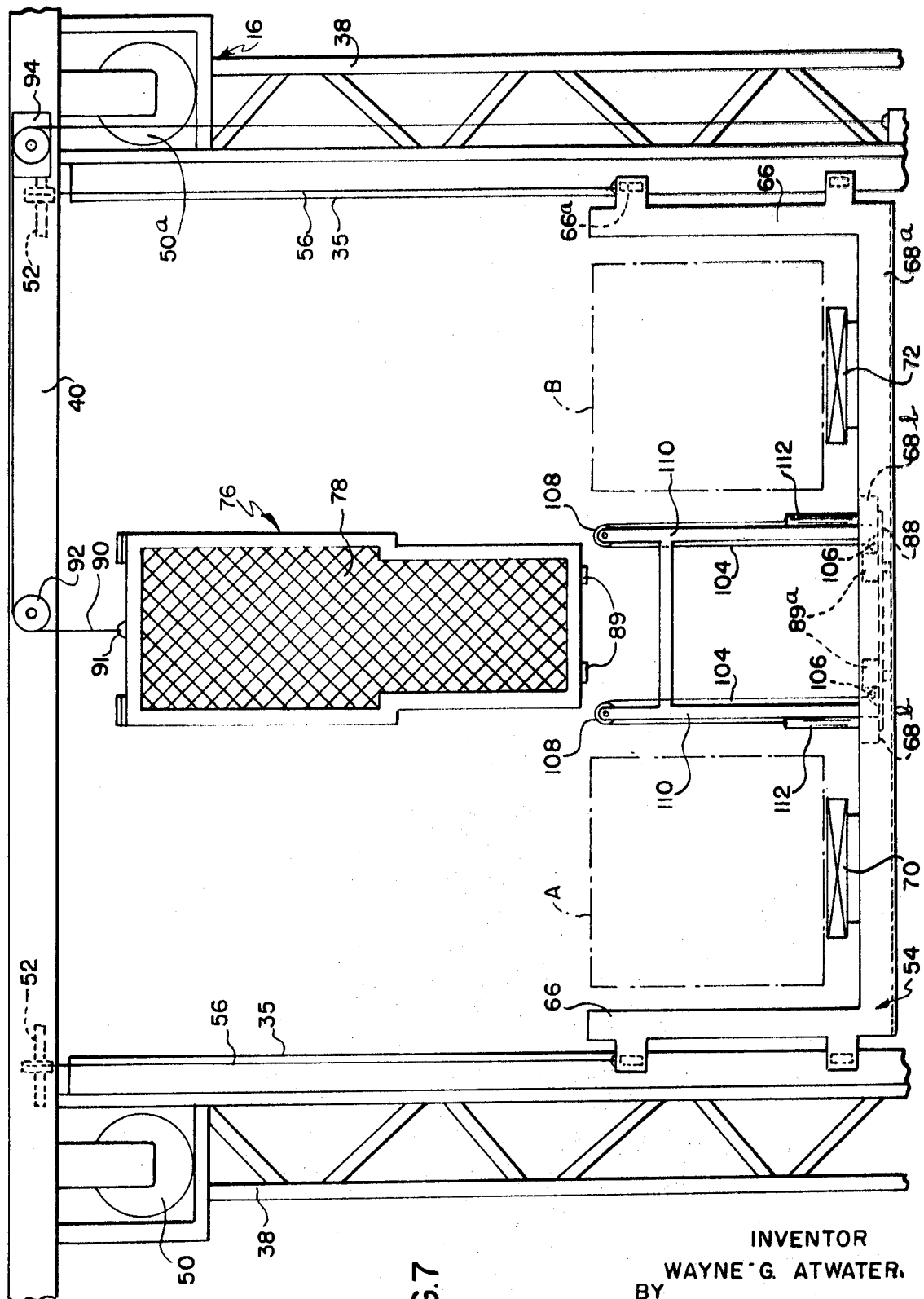
FIG. 7 is a fragmentary, side elevational view illustrating the separation of the operator's work station from the elevator portion in the event of failure of the suspension of the elevator portion and operation of the safety free-fall protection of the operator's station.
Figure 8:
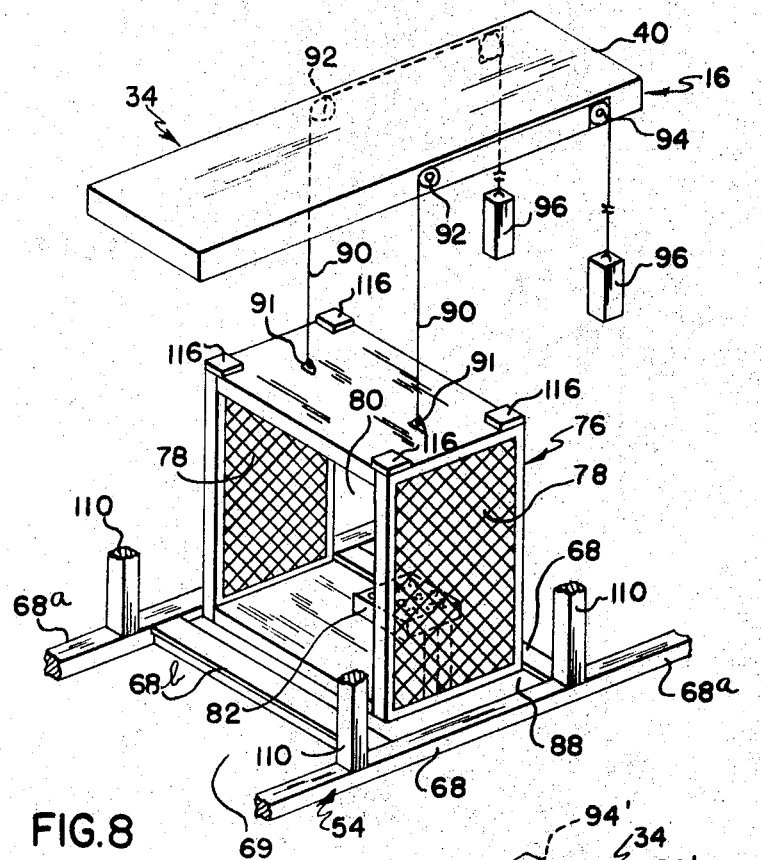
FIG. 8 is a fragmentary, perspective, diagrammatic illustration of the safety free-fall protection for the operator's work station for restricting relative vertical movement of the operator's work station with respect to the remainder of the load carrier mechanism.

Referring now in particular to FIGS. 6, 7 and 8, the aforementioned platform or support 88 for the operator's cage 76 is preferably movably mounted with respect to the elevator portion 54, and is normally maintained in nested position between side elements 68a and against the underside of cross elements 68b of the elevator portion, by means of the counterweight mechanism 100. Cross elements 68b extend between the side elements 68a of the elevator portion. The counterweight mechanism 100 includes lines 104 anchored as at 106 to the platform 88, with such lines 104 passing about pulleys 108 rotatably mounted on uprights 110 supported on the side members 68a of the elevator portion 54, and with weights 112 being secured to the lines 104. The weights 112 are of sufficient mass so that the weight of the operator and the cage supported on the platform 88 will not cause the platform to move vertically downwardly with respect to the elevator portion but instead platform 88 will ordinarily stay up against cross elements 68b. The upper end of the operator's cage 76 may be provided with cushioning means such as, for instance, resilient pads 116, which are adapted to cushion the impact of the cage engaging the upper frame portion 40 of the load carrier unit.

With the arrangement wherey the cage supporting platform 88 and the cage itself may move vertically downwardly relative to the elevator portion 54 of the load carrier unit, when the cage engages the upper frame section 40 of the load carrier unit due to raising of the elevator portion 54 to an uppermost position for handling of loads by the extractor mechanisms at the top or uppermost level of bins in the storage frame, the force of reaction of the upper frame section 40 is applied to the cage 76 and thus to counterweighted platform 88, causing the platform and cage to move vertically downwardly relative to the elevator portion and between the side elements 68a thereof, and substantially as illustrated in FIG. 6. Thus the elevator portion 54 can be moved vertically to its uppermost position without interference from the upstanding work cage 76, and the extractor mechanisms 70, 72 can be positioned for handling loads in the uppermost level of the storage bins 18. When the elevator 54 is lowered from its FIG. 6 position with respect to the conveyor portion 34 of the load carrier unit, the weights 112 cause the platform 88 to be moved upwardly together with the cage 76 until engagement of the platform with cross elements 68b of the elevator portion occurs, whereupon, the cage and platform 88 are disposed back in normal position.

From the foregoing description and accompanying drawings it will be seen that the present application provides a novel automatic warehousing system wherein a mechanized load carrier unit is provided for handling entire loads into and out of storage, and wherein the load carrier unit can also be used for order picking, with the load carrier unit including spaced extractor means mounted on a vertically movable elevator portion with a work station for an operator disposed between the extractor mechanisms and with the operator's station being so disposed with respect to the extractor mechanisms that in an order picking operation, one of the extractors can be controlled by the operator to remove a load of stock from a storage bin, while the other of the extractors can be utilized to support a container thereon for receiving stock items order picked by the operator from the one stock container and placed into the receiving container, after which the extractor mechanism supporting the stock load can be actuated to place the reaminder of the load of stock back into its storage bin. The invention also provides a warehousing system which includes means for mounting an operator's work station on the elevator portion of the load carrier for movement vertically relative to the elevator portion and means providing safety free-fall protection for the operator's work station, thereby restricting relative vertical movement of the operator's station with respect to the elevator portion of the load carrier unit. The invention also provides a novel arrangement of conveyor mechanisms for handling loads coming into the system and removing loads going out of the system, and for handling empty containers for receiving order picked stock during order picking operations by an operator riding the load carrier unit.

The terms and expressions which have been utilized are used as terms of description and not of limitation, and there is no intention in the use of such terms and expressions of excluding any equivalents of any of the features shown or described, or portions thereof, and it is recognized that various modifications of the invention are possible within the scope of the terms and expressions utilized to define the invention.

What is claimed is:

1. In an automatic warehousing system comprising in combination, a storage means adapted for storing loads of stock therein, at least one travel zone along which said storage means is disposed, a mechanized load carrier unit movable in said travel zone for automatically depositing loads of stock into and removing loads of stock from said storage means, said load carrier unit comprising a horizontally movable conveyor portion and an elevator portion mounted for vertical movement on said conveyor portion, extractor means mounted on said elevator portion for extension laterally of said elevator portion and into and out of said storage means for placing loads into and removing loads from said storage means, a work station on said elevator portion adjacent said extractor means, said work station being adapted to support a workman thereon for order picking operations by the workman from said load carrier unit, means mounting said work station for vertical movement relative to said elevator portion, the last mentioned means being movably mounted for downward vertical movement relative to said elevator portion upon application of predetermined downward force thereto, and with said work station comprising an upstanding compartment coupled to said last mentioned means, said compartment being adapted to receive a workman therein and having means providing for accessibility by the workman to said extractor means, said compartment normally projecting above said elevator portion, and means coacting between said last mentioned means and said compartment for releasably coupling said compartment to said last mentioned means, and permitting separation thereof upon predetermined force applied thereto.

2. A system in accordance with claim 1 including control means remote from said work station for controlling the automatic operation of said load carrier unit in its function of handling loads into and from said storage means, and other control means at said work station enabling a workman to control the movements of said load carrier unit from said work station.

3. A system in accordance with claim 1 wherein said extractor means comprises a pair of spaced extendible load handling mechanisms, means for separately energizing said load handling mechanisms, and said work station being disposed intermediate said load handling mechanisms, one of said load handling mechanisms being adapted to withdraw a load of stock from said storage means during an order picking operation while the other of said load handling mechanisms being adapted to support stock receiving means thereon, said work station being so disposed with respect to said load handling mechanisms that the workman can manually transfer items of stock during the order picking operation from said one load handling mechanism to said stock receiving means on the other of said load handling mechanisms.

4. A warehousing system in accordance with claim 3 wherein said compartment comprises a cage coupled to said last mentioned means, said cage being open on the sides thereof for accessibility by the workman to either of said load handling mechanisms.

5. A system in accordance with claim 1 wherein said last mentioned means comprises a support platform mounted on said elevator portion and means counter-weighting said support platform and normally maintaining said support platform and supported work station at a selected level with respect to said elevator portion, but wherein said support platform and work station are movable vertically downwardly with respect to said elevator portion and without interference from the latter upon predetermined loading of said work station.

6. A system in accordance with claim 1 including means providing free-fall protection for said work station whereby downward vertical movement of said work station with respect to said conveyor portion of said load carrier unit is restricted.

7. A system in accordance with claim 6 wherein said free-fall protection means comprises line means coupled to said work station, an over speed preventing means mounted on said conveyor portion, said line means coacting with said over speed preventing means to restrict vertical downward movement of said work station with respect to said conveyor portion.

8. A system in accordance with claim 1 including means providing free-fall protection for said elevator portion whereby downward vertical movement of said elevator portion with respect to said conveyor portion is restricted.

9. A system in accordance with claim 1 including power means for moving said elevator portion vertically with respect to said conveyor portion, the last mentioned means comprising a pair of spaced individually powered pull-hoisting mechanisms, each of said hoisting mechanisms being individually coupled to said elevator portion, each of said hoisting mechanisms being operative to singly carry the entire load of said elevator portion in the event of failure of one of said hoisting mechanisms.

10. In an automatic warehousing system comprising in combination, a storage means adapted for storing loads of stock therein, at least one travel zone along which said storage means is disposed, a mechanized load carrier unit movable in said travel zone for automatically depositing loads of stock into and removing loads of stock from said storage means, said load carrier unit comprising a horizontally movable conveyor portion, an elevator portion mounted for vertical movement on said conveyor portion, and extractor means mounted on said elevator portion for extension laterally of said elevator portion and into and out of said storage means for placing loads into and removing loads from said storage means, a work station on said elevator portion adjacent said extractor means, said work station being adapted to support a workman for order picking operations by the workman from said load carrier unit, said conveyor portion comprising a substantially horizontally movable carriage mounted on a rail extending lengthwise of said travel zone and mast structure extending vertically from said carriage, said mast structure supporting a frame on the upper end thereof, hoisting mechanism including power means mounted on said frame, and means coacting between said hoisting mechanism and said elevator portion for moving said elevator portion vertically with respect to said mast structure, said work station comprising a cage-like means normally projecting above said elevator portion, means mounting said work station for vertical movement relative to said elevator portion, the last mentioned means comprising a platform movably mounted on said elevator portion for downward vertical movement with respect to said elevator portion, said elevator portion comprising a framework having an opening beneath said work station, said platform being disposed in said opening, means coacting between said platform and said elevator portion for holding said platform against said elevator framework, and said cage-like means being supported on said platform and adapted to move vertically through said opening with said platform upon engagement of the upper end of said cage-like means with said frame on the upper end of said mast to thereby move said cage-like means and platform vertically downwardly with respect to said elevator portion, and wherein said cage-like means and said platform have means coacting therebetween for releasably holding said cage-like means on said platform but permitting separation of said cage-like means from said platform upon predetermined force applied between said cage-like means and said elevator portion to cause vertical separation thereof.

11. A system in accordance with claim 10 wherein said elevator portion comprises upright members including cable support members mounted thereon, and said means coacting between said platform and said elevator portion for holding said platform against said elevator framework comprising cables extending about said cable support members and being anchored to said platform, and counterweights supported by said cables for releasably holding said platform against said elevator portion.

12. A system in accordance with claim 10 and including free-fall protection means for said cage-like means whereby downward vertical movement of said cage-like means with respect to said conveyor portion is restricted.

13. A system in accordance with claim 12 wherein said free-fall protection means comprises cable means coupled to said cage-like means, said cable means extending about means on said conveyor portion, and speed limiting means coacting with said cable means for limiting the downward vertical movement of said cage-like means with respect to said conveyor portion, and counterweight means coacting with said cable means for maintaining said cable means in taut condition.

* * * * *